March 24, 1970   H. PIKAL   3,501,892
WRAPPING MACHINE USING LIMP FILM FOR IRREGULAR ARTICLES
Filed Oct. 4, 1968   5 Sheets-Sheet 1
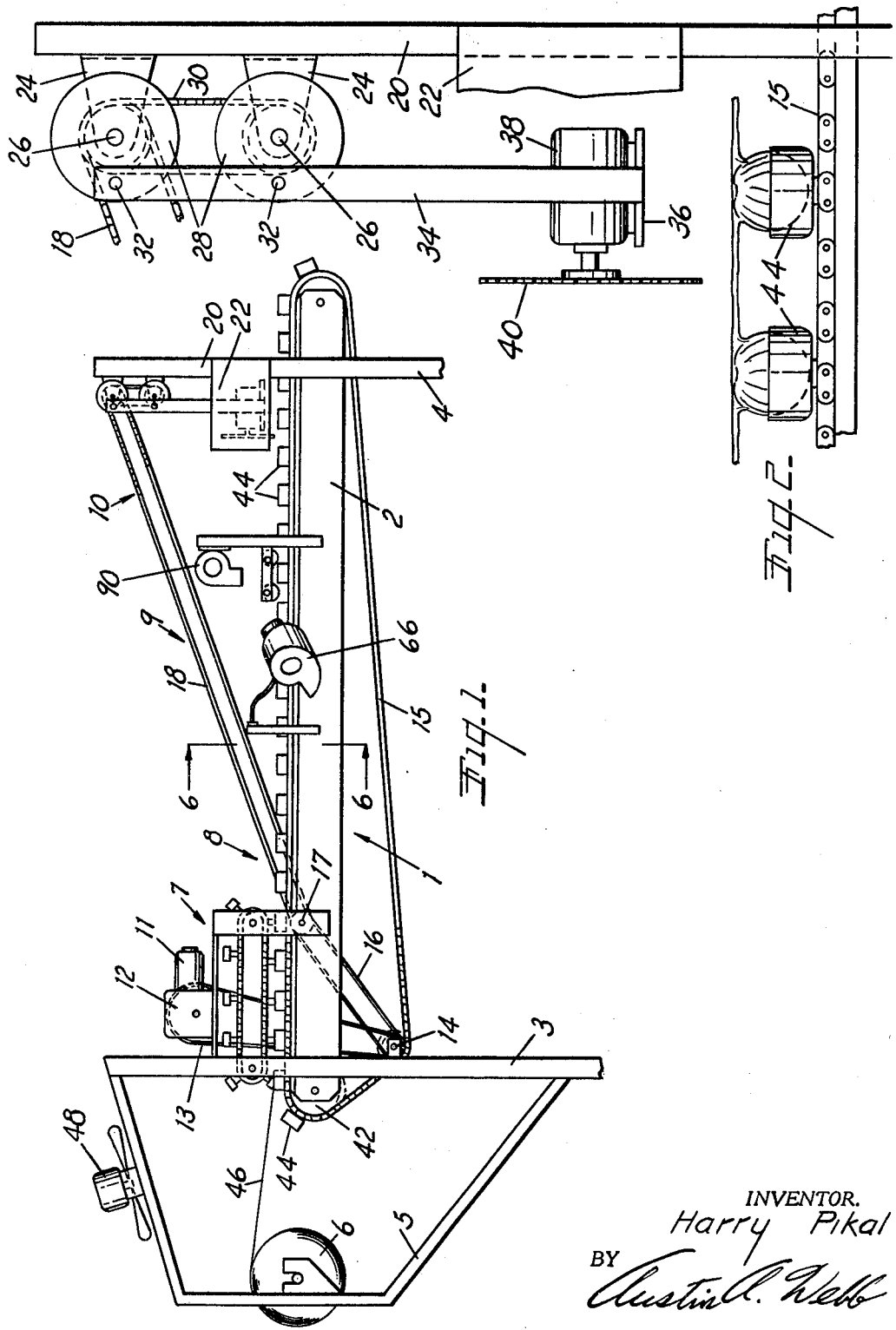
INVENTOR.
Harry Pikal
BY
Austin A. Webb
ATTORNEY

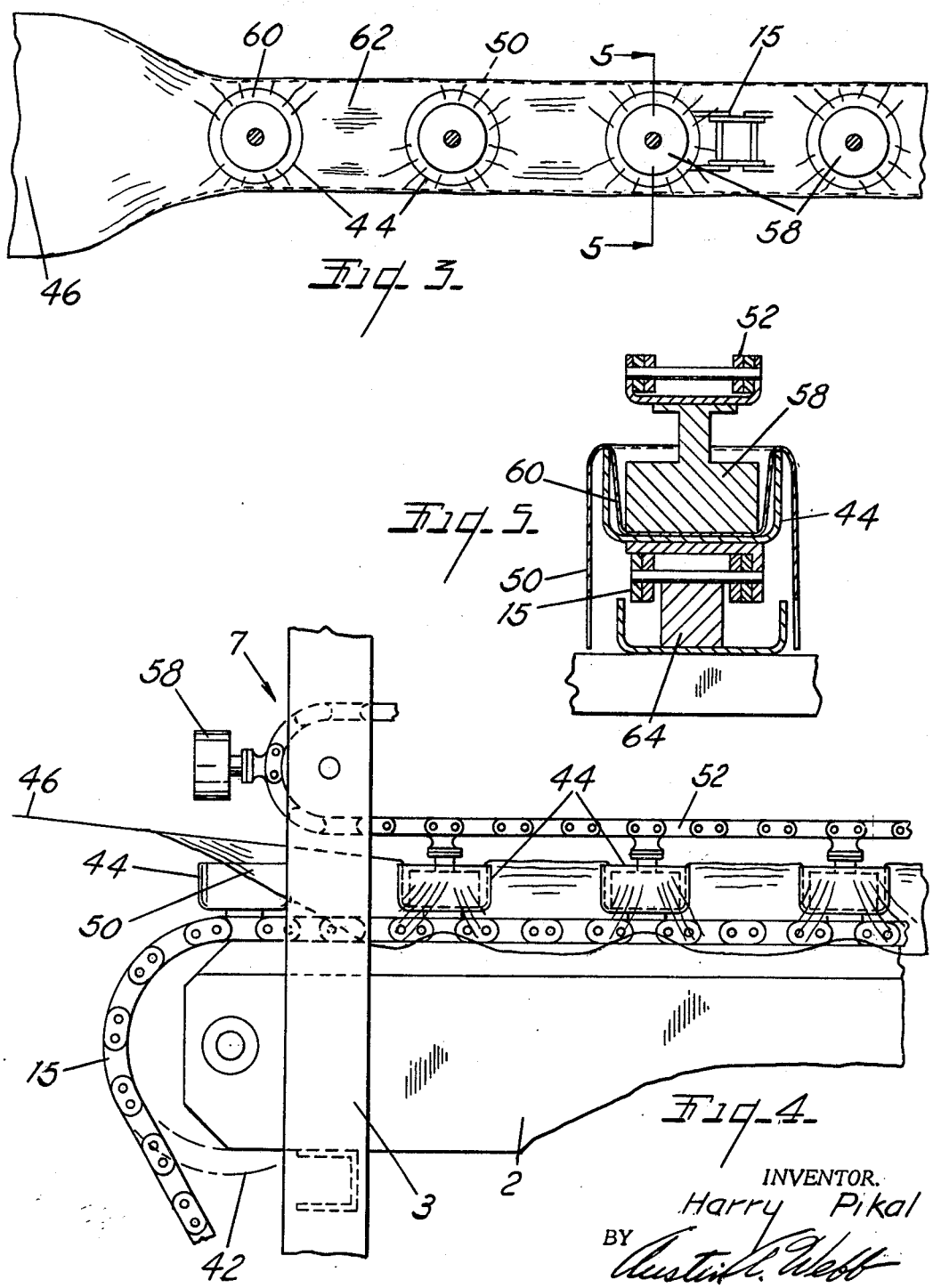

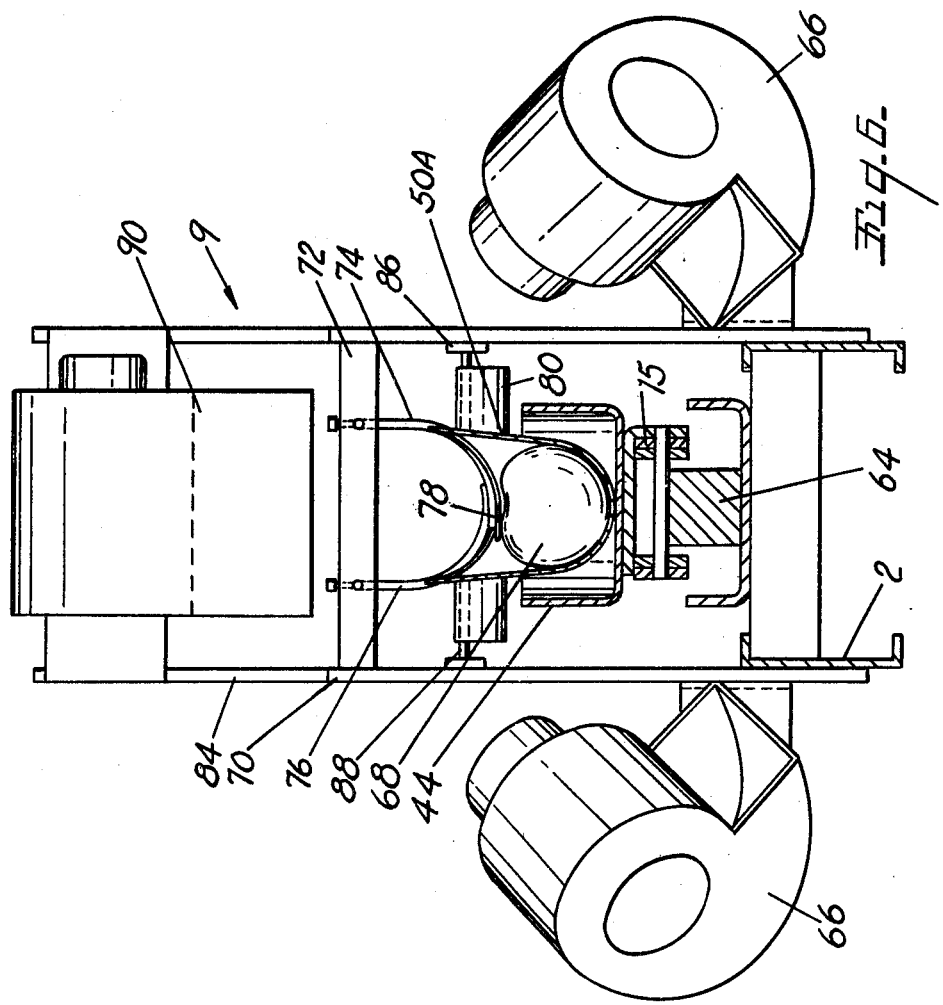

March 24, 1970  H. PIKAL  3,501,892
WRAPPING MACHINE USING LIMP FILM FOR IRREGULAR ARTICLES
Filed Oct. 4, 1968  5 Sheets-Sheet 4
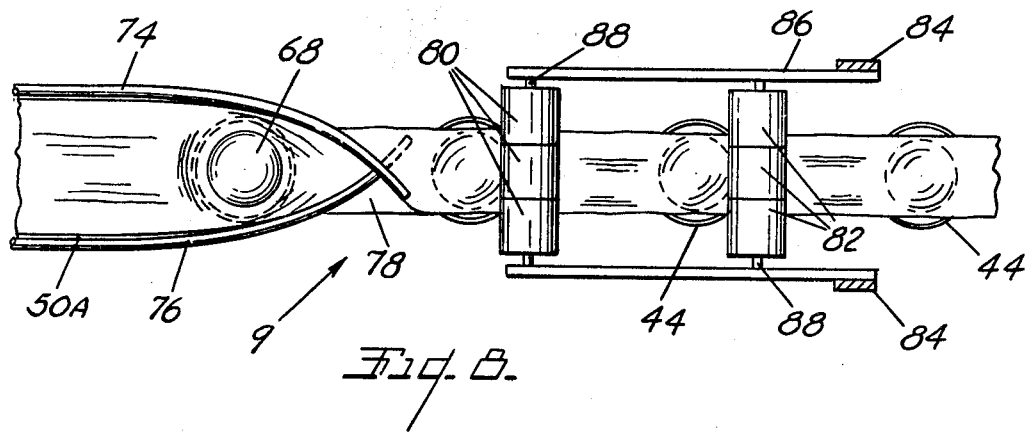
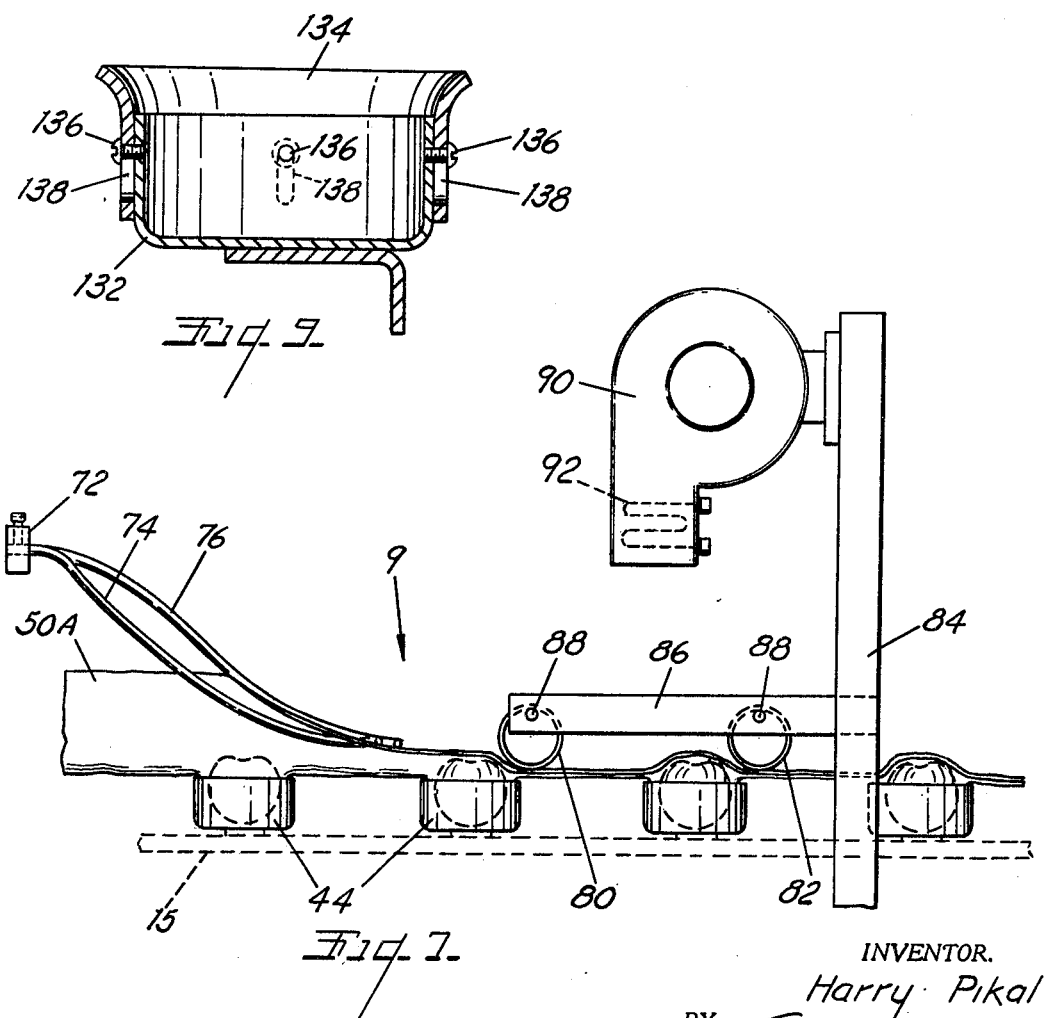
INVENTOR.
Harry Pikal
BY
ATTORNEY.

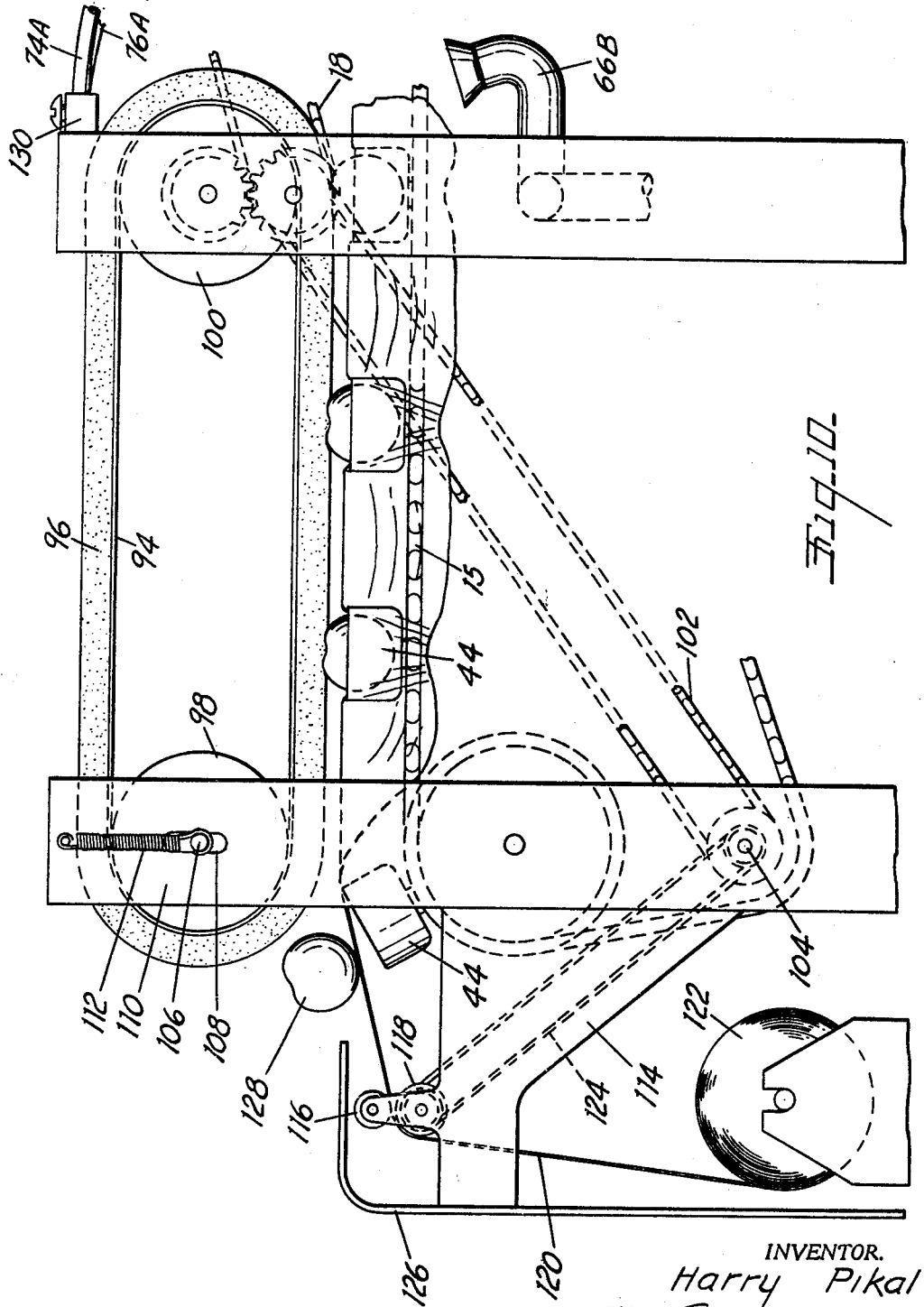

United States Patent Office 3,501,892
Patented Mar. 24, 1970

3,501,892
WRAPPING MACHINE USING LIMP FILM FOR IRREGULAR ARTICLES
Harry Pikal, R.R. 1, Box 200, Bangor, Mich. 49013
Filed Oct. 4, 1968, Ser. No. 765,203
Int. Cl. B65b 9/06, 47/06, 61/08
U.S. Cl. 53—180                                    9 Claims

ABSTRACT OF THE DISCLOSURE

A main conveyor advances article receiving cups under incoming limp film. A pocket forming conveyor over the main conveyor presses pocket forming dies into the cups and draws film along. An overhead fan blows sides of film down over sides of cups. Articles are loaded into pockets formed in cups at a loading station at end of pocket forming conveyor. Blowers on each side blow the sides of the film up where guide plows fold the sides over articles. Foating rollers seal the overfolded sides and a heated blower heats the rollers and seals the film. A cut-off operating between cup cuts the overfolded and sealed wrapper.

A modification has a soft yieldable belt in spaced relation over the incoming end of the main conveyor. Articles are loaded into the cups at the bight between the soft belt and the cups so that the belt causes the articles to form their own pouch when pressed into the cups.

OUTLINE OF INVENTION

The object of the wrapping machine is the inexpensive wrapping of irregular or spherical shaped articles in limp, synthetic plastic, film material. To this end, the invention provides for continuously advancing a web of the film with a conveyor for the articles to be wrapped. The conveyor has article receiving pockets thereon, and an overhead conveyor has projections thereon that form pouches for the articles by pressing the film into the pockets. At the same time, the projections function to pull in and advance the film. Because the limp film easily becomes tangled once it is freed of its supply roll, an overhead fan keeps the web flat as it leaves the roll; and as soon as the pouches are formed, the fan blows the sides of the web down on opposite sides of the conveyor. After the articles are loaded into the pouches in the pockets of the conveyor, side blowers lift the sides of the limp film up above the sides of the articles where guide wires or plows fold the sides into overlapped relation, on top of the articles. Rollers then seal the overlapped sides, against the tops of the articles and therebetween. Invention is believed to lie in continuous control of the limp film by the pouch forming plungers, the initial overhead blower and the two side blowers that condition the film for lapping and sealing.

The drawings, of which there are five sheets, show two forms of the invention.

FIGURE 1 is a side elevational view of a first form of the wrapping machine.

FIGURE 2 is a fragmentary enlarged side elevational view of the cut-off or package separating portion of the machine.

FIGURE 3 is a fragmentary enlarged horizontal cross sectional view through the pouch forming portion at the inlet end of the machine.

FIGURE 4 is a fragmentary enlarged side elevational view of the pouch forming portion of the machine.

FIGURE 5 is a fragmentary vertical cross sectional view taken along the plane of the line 5—5 in FIGURE 3.

FIGURE 6 is a fragmentary transverse cross sectional view taken along the plane of the line 6—6 in FIGURE 1.

FIGURE 7 is a fragmentary enlarged side elevational view of the overfolding end wrapper sealing portion of the machine.

FIGURE 8 is a fragmentary top plan view of the overfolding end sealing portion.

FIGURE 9 is a fragmentary elevational view showing a modified form of adjustable article receiving cup or flight.

FIGURE 10 is a side elevational view of a first modified form of the machine showing the feeding and loading end of the machine.

The machine consists generally of a main wrapping conveyor indicated generally at 1 and supported by longitudinal side members 2 which are in turn supported by legs 3 and 4. A framework 5 supports a supply roll 6 of limp synthetic wrapping material at the infeeding end of the machine which delivers the film over the conveyor 1 and underneath a pouch forming conveyor indicated generally by the numeral 7. To the right of the pouch forming conveyor is an open loading station 8 followed by an overfolding and sealing station 9 from which the main conveyor advances the wrapped articles to a cut-off or article separating section 10.

The machine is driven by a motor 11 and associated gear box 12 mounted over the pouch forming conveyor 7 and functioning to drive a belt 13 which drives the cross shaft 14. The cross shaft 14 carries a drive pulley which drives the chain 15 of the main conveyor. The chain 16 drives a shaft 17 which is gear connected to drive the pouch forming conveyor 7. A chain 18 is driven from the shaft 17 to drive the cut-off 10 as will be described presently.

Considering the cut-off 10 in greater detail attention is invited to FIGURE 2 which shows the legs 4 to be provided with upright extensions 20 which support a guard 22 over the discharge end of the main conveyor. One of the uprights carries brackets 24 on which stub shafts 26 and crank wheels 28 are mounted. The upper wheel 28 is driven by the chain 18 while a connecting chain 30 drives the lower wheel in the same direction to rotate the crank pins 32. The pins 32 oscillate a vertical support rod or bar 34 which carries a support 36 on its lower end for a motor 38. The motor 38 drives a cut-off disc saw 40 which descends between articles on the main conveyor while advancing with the articles to cut the web of wrapping material between the wrapped articles.

Returning to the infeeding end of the machine at the left side of FIGURE 1 it will be noted that the chain 15 driven by the previously described shaft 14 passes over a pulley 42 to continuously advance a series of article receiving cups or flights 44 underneath the incoming web 46 of the wrapping material. A fan 48 mounted on the framework 5 over the incoming web keeps the web flight untangled until the cup shaped flaps are in supporting position underneath the center of the web. At this point the current of air from the fan 48 functions to blow the sides of the web downwardly over the sides of the conveyor 1 as is indicated at 50.

The pouch forming conveyor 7 consists of a chain 52 trained around a sprocket 54 on the shaft 56 and driven in the same direction as the main conveyor chain 15 by the previously described shaft 17. The chain 52 carries a series of projecting plungers or dies 58 which project into each successive cup 41 on the main conveyor. In so doing the film 46 is drawn transversely inwardly and depressed into the cup as at 60 in FIGURE 5 and is stretched or held taut between the cups as at 62 in FIGURES 3 and 4. The plungers 58 thus function to pull the web 46 off of the supply roll 6 at the same speed as the speed of the main conveyor. The main conveyor or chain 15 is supported along its upper reach by a suitable rail 64.

As the main conveyor with the pouches 60 formed in the wrapping film in the flights 44 emerges from underneath the pouch forming conveyor 7, there are several cups and pouches exposed at the loading station 8 at which an operator may place articles to be wrapped in each empty pouch. The form of the machine illustrated is designed to wrap apples which are indicated conventionally in the drawings but other articles and different shaped concave flight cups could be substituted if desired.

Positioned adjacent to the loading station 8 is the overfolding and sealing station 9 which includes a pair of blowers 66 which are mounted in upwardly and rearwardly inclined relation on each side of the longitudinal frame member 2 to blow upwardly and rearwardly underneath the overhanging sides 50 of the limp film. As is shown more clearly in FIGURE 6, these blowers lift the side edges 50 upwardly and inwardly as at 50A on opposite sides of the articles 68 in the cups 44. Uprights 70 support a crossbar 72 which in turn supports film folding and guiding rods or plows 74 and 76. The rod 74 engages one side of the limp film and guides it downwardly and transversely inwardly to a first overfolded edge 78 while the other guide rod 76 curves downwardly in crossing relation to the lower end of the rod 74 to overfold the opposite side edge of the film.

Immediately following the guide rods 74 and 76 the overfolded edges of the film come under the influence of sealing rolls 80 and 82 shown more clearly in FIGURES 7 and 8. Uprights 84 support rearwardly projecting bars 86 with cross pins 88 extending between the pins. The rollers 80 and 82 are hollow cylindrical members so they can roll along the overfolded edges of the film while rising and falling over the tops of the articles 68. The rollers are divided longitudinally into sections to conform to the transverse curvature of the articles. A blower 90 with a heating element 92 therein is mounted over the rollers 80 and 82 to discharge downwardly between the rollers where the heated air will heat both the rollers and the overfolded central portions of the film. As a result the web of wrapping material is formed into a sealed tube which is then advanced to the previously described cut-off 10. The modified form of the wrapping machine shown in FIGURE 10 provides essentially the same main conveyor chain 15 with recessed article receiving cups or flights 44. However, the overhead pouch forming conveyor at the inlet end of the machine consists of a belt 94 having a soft deformable face 96. The belt is trained around an idler roll 98 and a drive roll 100, the latter being driven by a chain or belt 102 from the same shaft 104 as the main conveyor. The roll 98 is carried by a shaft 106 that is vertically movable in a slot 108 in the upright end 110 of the supporting frame and springs 112 yieldably support the shaft so the inlet end of the pouch forming conveyor is weight biased toward the main conveyor 15.

Brackets 114 on the upright 110 support a pair of film feeding rolls 116 and 118 which draw the film of wrapping material 120 off of a supply roll 122 and deliver it in flat condition between the main conveyor and the pouch forming conveyor. A chain or belt 124 driven from the shaft 104 drives the feed rolls to advance the web at the same speed as the conveyors. The brackets 114 further carry a suitable support and guard 126 that extends over the feed rolls and downwardly in front of the supply roll 122. The support 126 forms a convenient loading station at which an operator may stand to insert articles to be wrapped such as the apple 128 between the converging portions of the main conveyor and the pouch forming belt 96. The operator may either press the apple 128 into the cup 44 or simply hold it in place until the apple is engaged in the bight between the belt 96 and the film of wrapping material stretched over the cup 44. In the latter case the yieldably supported and weight biased end of the pouch forming conveyor will automatically press the article into the cup on the main conveyor.

Since the loading station 8 of the first form of the wrapping machine becomes unnecessary with this modified form of wrapping machine, a cross bar 130 is mounted on the support for the driven roll 100 and this cross bar carries side folding or guiding rods 74A and 76A which function in the same manner as the rods 74 and 76 in the first form of the machine. It will be understood that side blowers 66 are similarly upwardly and rearwardly directed sources of air flow are provided to coact with the guide rods 74A and 76A.

The adjustable article receiving cup or flight shown in FIGURE 9 may be used on either form of the machine described to rapidly convert the machine for handling articles of different sizes and shapes. The lower cup shaped element 132 is provided with an adjustable folding sleeve 134 and screws 136 pass through slots 138 into the wall of the cup so that the height of the cup or flight can be quickly adjusted to accommodate larger or smaller articles. The shape of the article receiving cups can also be varied or interchanged on the main conveyor as will be readily understandable. While the articles to be wrapped have been described as of irregular shape, the machine will obviously wrap regular shaped articles.

What is claimed as new is:

1. A wrapping machine comprising a first conveyor having pocket forming fixtures thereon advanced from an inlet end to an outlet end, means arranged to deliver a web of limp film wrapping material in alignment over the inlet end of said first conveyor and in projecting relation beyond the sides thereof, a second conveyor positioned over the inlet end of said first conveyor and having a lower reach advanced in opposed timed relation with said fixtures and coacting with the fixtures to form pockets in the center of said web and advance the web, an upwardly and outwardly exposed portion of said first conveyor constituting a loading station at one end of said second conveyor at which articles may be introduced into said fixtures and on top of said web, a folding station located alongside said first conveyor and including sources of air currents directed upwardly from under the projecting sides of said web to blow the latter upwardly, plow means positioned in the path of the upwardly blown sides of said web and arranged to fold the sides transversely into overlapped relation to said fixtures and articles therein, and top sealing means positioned over said first conveyor and cooperative with said overfolded sides to continuously seal the same over the tops of articles in said fixtures and therebetween.

2. A wrapping machine as defined in claim 1 in which there is a source of air current directed downwardly over the inlet end of said first conveyor to blow the sides of said web downwardly on opposite sides of said fixtures and first conveyor.

3. A wrapping machine as defined in claim 1 or 2 in which there is a cutoff mechanism over said first conveyor behind said sealing means, and a drive connection to said mechanism timed to cut said overfolded web between said fixtures.

4. A wrapping machine as defined in claim 1 in which there is a rotary cutter driven in a plane transverse to said first conveyor and located behind said sealing means, a movable support for said cutter, and a drive connection driven in timed relation to said first conveyor and connected to move said support in an orbital path and in an upright longitudinal plane over said first conveyor.

5. A wrapping machine as defined in claims 1 or 2 in which said second conveyor has projections thereon positioned to enter into said fixtures and form said pockets in said web and pull said web from said means to deliver a web, said loading station being located between said second conveyor and said folding station.

6. A wrapping machine as defined in claims 1 or 2 in which said second conveyor comprises a belt having a vertically yieldable face advanced over the inlet end of said first conveyor, said loading station being located at the inlet end of said first conveyor whereby articles presented to the bight at the convergence of said first and second conveyor are pressed into said fixtures by said belt and form the pockets in said web.

7. A wrapping machine as defined in claims 1 or 2 in which said top sealing means comprises a transversely extending roller mounted over said first conveyor and movable vertically to roll along the overlapped edges of said web and over articles in said fixtures, and a source of heated air directed downwardly onto said roller and said overfolded sides of the web.

8. A wrapping machine as defined in claims 1 or 2 in which there are two rollers in said sealing means spaced longitudinally along said first conveyor, with a source of heated air directed downwardly between the rollers.

9. A wrapping machine as defined in claim 1 in which said second conveyor has a cushion face of substantial thickness, said loading station being located at the inlet end of said first conveyor whereby articles presented to the bight at the convergence of said first and second conveyors are pressed into said fixtures by said cushion face and form pockets in said web.

References Cited
UNITED STATES PATENTS

| | | | |
|---|---|---|---|
| 2,653,430 | 9/1953 | Vogt | 53—122 X |
| 3,035,379 | 5/1962 | Cloots | 53—34 |
| 3,382,644 | 5/1968 | Vogt | 53—29 |

TRAVIS S. McGEHEE, Primary Examiner

NEIL ABRAMS, Assistant Examiner

U.S. Cl. X.R.

53—195, 221